June 29, 1954

R. E. CRANDALL 2,682,381

COMBINED AILERON AND LANDING FLAP

Filed Oct. 30, 1948

INVENTOR:
RONALD E. CRANDALL

BY Herbert E. Metcalf

HIS PATENT ATTORNEY

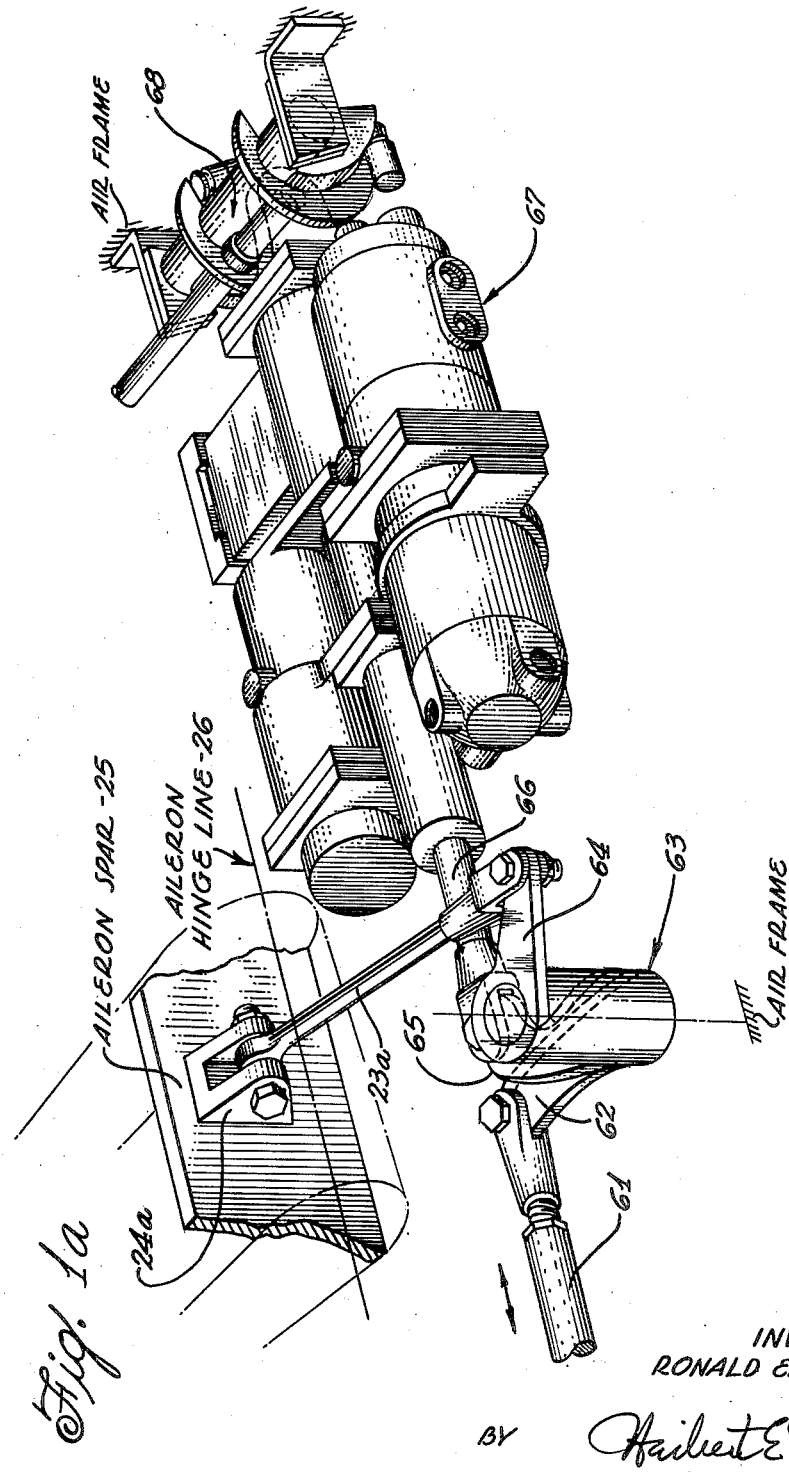

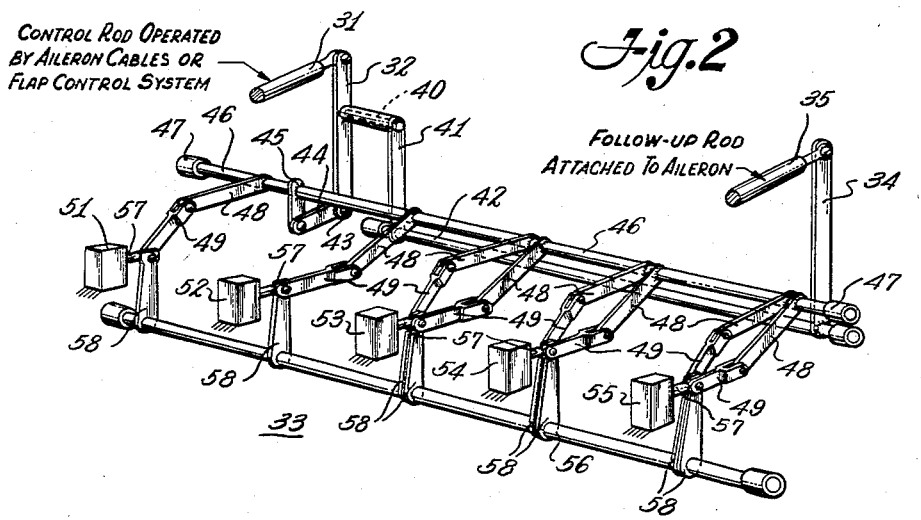
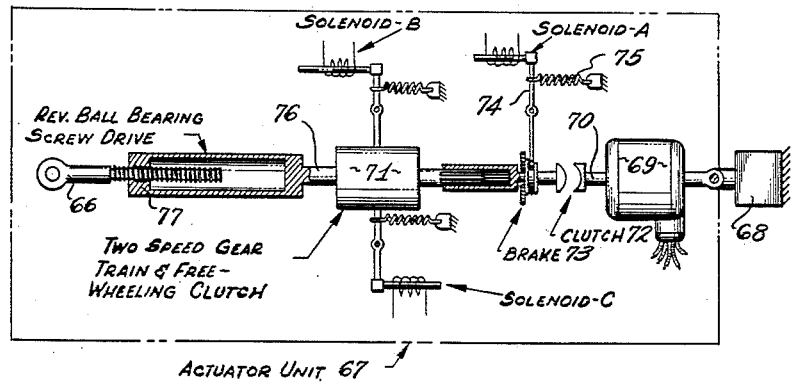

INVENTOR.
RONALD E. CRANDALL

June 29, 1954  R. E. CRANDALL  2,682,381
COMBINED AILERON AND LANDING FLAP
Filed Oct. 30, 1948  5 Sheets-Sheet 5

INVENTOR.
RONALD E. CRANDALL
BY
Herbert E. Metcalf
Attorney

Patented June 29, 1954

2,682,381

UNITED STATES PATENT OFFICE 2,682,381

COMBINED AILERON AND LANDING FLAP

Ronald E. Crandall, Los Angeles, Calif., assignor to Northrop Aircraft, Inc., Hawthorne, Calif., a corporation of California Application October 30, 1948, Serial No. 57,518

4 Claims. (Cl. 244—42)

This invention relates to airplane control systems, and more particularly to a means for combining two functions, operated by two independent controls, into a single flight control surface of an airfoil.

In high speed airplanes with small wing areas and high wing loadings, it becomes increasingly more difficult to attain low landing speeds, for the main reason that landing flap area cannot be made large enough to contribute the desired extra lift. The leading edge of the landing flap cannot be moved forward to widen the flap without cutting through the rear wing spar which must reach to the fuselage or body section. The landing flap cannot be lengthened in the outboard direction beyond a certain limit without sacrificing necessary aileron surface area.

It is, therefore, an object of the present invention to provide a method for increasing the lift of an airplane in flight without compromising on other desirable features.

Another factor of importance concerning present-day aircraft controls systems is the problem of handling very large or very heavily loaded control surfaces by pilot control stick forces small enough to be possible or practical under conventional piloting procedures. Control surface-mounted servo tabs have been extensively used to assist the pilot in overcoming these high control forces, but more recent developments have been along the line of power-operated systems employed in conjunction with direct control cable connections to surfaces having no servo tabs.

Another method recently adopted, notably in the United States Air Force heavy bomber designated as the B-35, manufactured by the assignee of the present invention, is the use of full-power flight controls wherein the pilot's control elements merely introduce signals into power-driven actuators connected to the movable surfaces. This full-power method is ideally suited for an aircraft control system because of its irreversibility and overall simplicity as compared to a power-boost system.

Recognizing these advantageous features of the full-power control system method, it is a further object of this invention to apply the principles of duplication of functions performed by a single airfoil to such a full-power system, or systems, and thereby to provide a control system to independently deflect an attitude control surface, which is normally operated by one of two alternate and smoothly substitutable full-power control systems, without affecting the range of movement, operating characteristics, or the operation of the normal systems in any way after the newly deflected position is reached, or at any time while the separately deflecting action is in motion. In this way, for example, full-span landing flaps can be achieved by combining aileron drooping with flap panel lowering, and a detailed description of this embodiment is contained in this specification.

The specific apparatus which embodys the present method of control to be described herein comprises a full-power aileron control system normally controlled by either of two power mechanisms, with a mechanism added to move the aileron independently of normal roll control by energizing that power system which happens to be engaged to drive the aileron, this added movement being in a substantially linear relation to movement of a separate landing flap. Other surfaces or systems can be combined equally as well, using the same method. Therefore, it is to be understood that this invention is not limited in any way to the apparatus of the present application.

Reference is made to the following drawings, in which:

Figure 1a is a perspective view in continuance of Figure 1, showing the outboard end of the same control mechanism.

Figure 2 is a perspective diagrammatic view showing the internal construction of a control switch box for operating an electrical aileron actuator.

Figure 3 is a block diagram showing the components of an electric aileron actuator unit.

Figure 1:
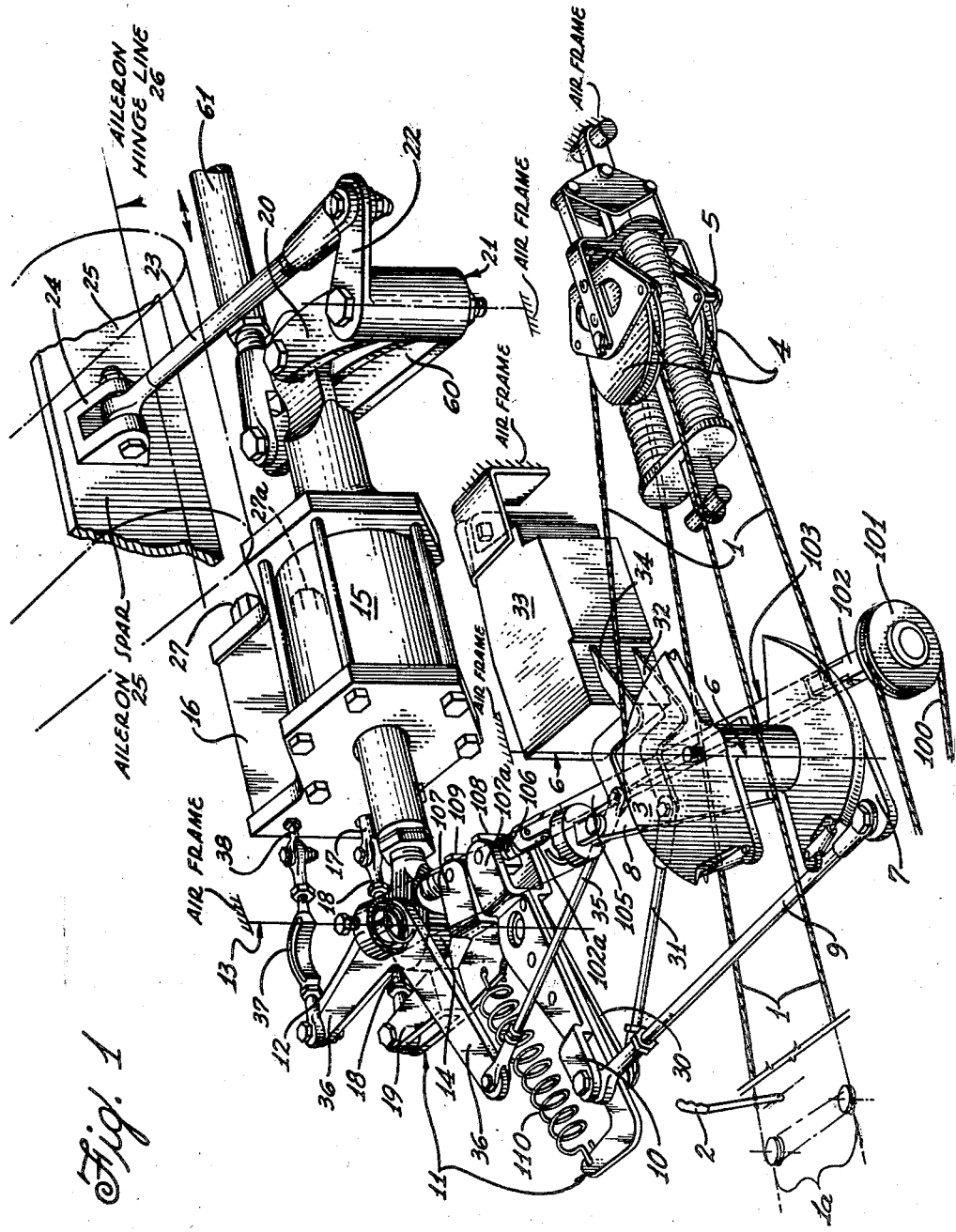
Figure 1 is a perspective view showing the inboard end of an aileron control mechanism connected to operate one aileron of an airplane.

Referring first to Figure 1, two aileron cables 1,1 are conventionally connected between a pilot's control stick 2 and a quadrant assembly 3 located near the aileron to be operated, so that lateral movement of the control stick 2 will produce rotational movement of the quadrant assembly 3. Before reaching the quadrant assembly 3, the cables 1,1 pass over pulleys 4,4 of a cable tension regulator 5 designed to maintain a substantially constant tension with varying temperature conditions. The quadrant assembly 3, which is pivoted to rotate about a fixed vertical axis 6, has two arms 7 and 8 attached thereon which project horizontally from the quadrant axis 6 approximately 90° apart. A horizontal aileron control rod 9 is pin-connected to the end of the quadrant control arm 7 and to a control rod arm 10 of a bell crank assembly 11. Bell crank assembly 11 also includes a valve control crank 19 formed integrally with a crank leg 30 which is positioned just below the control rod arm 10. These crank assembly components 10, 19 and 30 are pivotally mounted on an axis pin 13 which is fixed to the airplane structure and is parallel to the quadrant assembly axis 6. Control rod arm 10 is connected to valve control crank 19 in a manner to be described later. To the end of the quadrant spring arm 8 is pin-connected a horizontal spring-loaded centering rod 12 which is rotatably attached to axis pin 13.

When the quadrant assembly 3 is in the neutral position, the aileron control rod 9 and its quadrant control arm 7 form an angle of about 90°, while the centering rod 12 and its quadrant spring arm 8 form a straight line. Therefore, when the control stick 2 is moved laterally from the neutral position, the aileron control rod 9 will rotate the control rod arm 10 of the bell crank assembly 11 about its axis pin 13, and the centering rod 12 will be stretched and exerting a turning moment on the quadrant assembly 3 tending to return the quadrant assembly 3 and the entire system to neutral. The centering rod 12 produces a synthetic "feel" to the control stick, and the farther the stick is moved from the neutral aileron position, the larger will be the restoring force.

Also connected to the bell crank axis pin 13 is a piston rod 14 of a hydraulic actuating cylinder 15. This actuating cylinder 15 has a servo control valve 16 mounted on the cylinder housing. The control valve 16 is provided with a valve shaft 17 which extends from the control valve parallel to and at the same end of the cylinder 15 as the piston rod 14. A valve operating rod 18 connected between the valve shaft 17 and a valve control crank 19 of the bell crank assembly 11. The valve control crank 19 and the control rod arm 10 of the bell crank assembly 11 are connected together in such a manner that the vertex angle between them can be changed by an independent outside action. This connection and its operation will be described in detail later.

The closed end of the actuating cylinder 15 opposite the piston rod 14 is supported by and pin-connected to a cylinder support arm 20 of an inboard lever assembly 21 which rotates about a fixed vertical axis. An upper arm 22 of this lever assembly 21 carries a link 23 which is connected to an aileron fitting 24 attached to the aileron spar 25, so that longitudinal translation of the link 23 will cause aileron deflection about the aileron hinge line 26.

Hydraulic pressure 27 and return 27a lines are supplied from the airplane's hydraulic system to the control valve 16 and fluid under pressure is directed by the valve to the proper side of the enclosed piston (not shown) attached to the piston rod 14 of the actuating cylinder 15, when the valve shaft 17 is displaced from its neutral position, to move the cylinder 15 relative to the piston rod 14. By "proper side" of the piston is meant that side where the applied pressure will move the cylinder housing in the same direction that the valve shaft 17 was moved. Since the piston rod 14 is fixed to the rigid bell crank axis pin 13, and since the servo control valve 16 is mounted on the cylinder housing 15, it may be readily understood that the cylinder housing 15 will move only as far as the valve shaft was originally displaced, since movement of the control valve 16 with the cylinder housing 15 will return the valve shaft 17 to neutral with respect to the valve. The system is particularly designed so that if the surface load at some deflected position exceeds a pre-determined danger value, the hydraulic fluid flow will be stalled and pushed back into the high pressure line until a smaller deflection is reached where the air load is lowered and thus kept below a safe maximum. This full-power hydraulic control system is the subject of an abandoned application, Serial Number 23,567, filed April 27, 1948, and owned by the assignee of the instant application.

One hydraulic actuator is used per aileron, and a similar system cable-controlled by the same control stick is installed to actuate the aileron surface on the other side of the airplane, as indicated by cables 1a in Figure 1. The aileron system thus far described is a complete full-power hydraulic control system capable of satisfactorily controlling the attitude of two roll control surfaces of an airplane. It will now be shown how a second or standby system is combined with the first to be operated from the same control stick, but to operate the aileron by electrical means.

Connected to the crank leg 30, previously described as being formed integrally with the valve control crank 19, is a switch control rod 31 which is in turn connected to a control lever 32 of a switch box 33. In this manner, the control lever 32 will be moved in exact accordance with the valve control crank 19 which, of course, is controlled by the pilot's control stick 2 through the quadrant assembly 3, aileron control rod 9, and control rod arm 10. The switch box 33 has a follow-up lever 34 which is connected by a follow-up rod 35 to one end of a follow-up crank 36 pivoted on the same axis pin 13 as the bell crank assembly 11. The other end of the follow-up crank 36 is connected by a push-pull rod 37 to an eye fitting 38 installed on the actuating cylinder housing 15. Thus, the follow-up lever 34 is made to assume a definite position corresponding to the aileron position, since the cylinder housing 15 is connected with the aileron 25 as described above.

The construction of the switch box 33 is shown in Figure 2, which shows the box in an upright position with the two levers 32 and 34 projecting from the top. The control lever 32 to which the switch control rod 31 is connected at the top is rotatably attached at a point approximately one-third of its length down from the top to a sub-lever 40 extended from a sub-lever 41 which has the same motion as the follow-up lever 34, since the two are rigidly connected together at their lower ends by a connection shaft 42, which forms the axis of rotation for the follow-up lever 34. The lower end of the control lever 32 connects by a link pin 43 to a link bar 44 in turn pin-connected to a crank arm 45 which is welded to a control shaft 46. The control shaft 46 is mounted in stationary end bearings 47, 47 so that it is free to rotate about its longitudinal axis. Along the length of this control shaft are welded various links 48 which are pin-connected to other links 49 whose purpose it is to effect the operation of five micro switches 51 through 55 mounted securely in adjustable brackets (not shown) in the switch box 33. These links are arranged as follows: an idler shaft 56 is positioned in the switch box 33 so it is parallel to the control shaft 46 and located directly under the ends of the micro switch actuators 57. Eight vertical links 58 are separately pivoted on the idler shaft 56 and extend upwardly so that their top ends are immediately adjacent to the switch actuators 57 in a position to move the actuators, one such link for the first switch 51, one link for the second switch 52, and two links each for the third 53, fourth 54, and fifth 55 switches. Connected to the top of each vertical link 58 is a connecting link 49 which is pinned to one of the welded links 48 on the control shaft 46.

When assembled, the connecting links 49 and the welded links 48 occupy the space between the tops of the vertical links 58 and the control shaft 46, as shown in Figure 2, but do not form a straight line connection. For the first switch 51, the connecting link and the welded link slant up toward each other, and for the second switch 52, the connecting link and the welded link slant down toward each other. For the three remaining switches, which have two sets of associated links instead of only one, one set for each of these switches is arranged identically with the set for the first switch 51, and the second set for each remaining switch is arranged identically with the set for the second switch 52.

When the mechanism is assembled in this manner, when the top of the control shaft 46 is turned toward the micro switches, the first 51, third 53, fourth 54, and fifth 55 switches will be actuated by the link sets which approach a straight line and thereby force the respective switch actuators inwardly to close the circuit. When the top of the control shaft 46 is turned away from the micro switches, the second 52, third 53, fourth 54, and fifth 55 switches will be actuated by the remaining link sets which took no part in the previous operation.

The position of each switch on its support bracket is carefully adjusted and then locked so that as a whole they are actuated progressively when the control shaft 46 is turned in either direction from neutral, either the first 51 or second switch 52 being closed first, depending on the direction of rotation, and then the third 53, fourth 54, and fifth 55 switches in the order named. As will be explained further later, the first and second switches are direction and low speed switches, i. e., revolve the controlled motor at low speed to apply either up or down aileron, and the remaining three switches are speed control switches which serve to increase the speed of aileron movement with increasing angle of rotation of the control shaft 46 from the neutral position.

The control lever 32 of the switch box may pivot around either of the two points, i. e., the sub-lever pin 40 or the upper connection of lever 32 with the switch control rod 31, and this action makes the follow-up action possible. When the switch control rod 31 moves the control lever 32 toward the bell crank assembly 11, for example, as when the control stick 2 is moved, the control lever 32 will pivot about the sub-lever pin 40, since the aileron at this time is still stationary and, as described, is directly connected to the sub-lever 41 through the cylinder housing 15, the follow-up crank 36, the follow-up rod 35, follow-up lever 34, and connection shaft 42. This action of the control lever 32 will move the lower end of the crank arm 45 to the left in Figure 2, causing a clockwise rotation of the control shaft 46, and thus actuating one or more micro switches. As a result, the aileron is in motion, and it is connected to push the follow-up rod 35 in the same direction which the switch control rod 31 was pushed; in this instance, to the right, in Figure 2. As this occurs, the sub-lever 41 will act on the control lever 32 to rotate it about the end of the switch control rod 31, since this upper point is now being held solidly by the control stick. When the control lever 32 pivots in this manner, its lower end will be moved back to the right, in Figure 2, turning the control shaft 46 counterclockwise to its original position, where the micro switches are opened in the reverse order of their closing, and the aileron is stopped at some deflected position. If the control stick is now moved back to neutral, the reverse action will take place, and the opposite directional switch will be closed to return the aileron to neutral, at which time the switches will be off again. Thus, the aileron surface is made to respond to stick movement and assume definite positions corresponding to various stick displacements. The three speed control switches 53, 54, and 55 function to make the speed of aileron movement closely simulate the speed of control stick movement.

As shown in Figure 1, a lower arm 60 of the inboard lever assembly 21 is pin-connected to a tube assembly 61 which is located in the wing forward of the aileron 25, and extends from one end of the aileron to the other end, as further shown in Figure 1a. At this other end, tube assembly 61 is pin-connected to a lower crank 62 of an outboard lever assembly 63, mounted to rotate about a fixed axis similar to the inboard lever assembly 21. An upper crank 64 of this outboard lever assembly 63 connects by a link 23a to another aileron fitting 24a to form a second point of application of control force to the aileron spar 25.

An actuator support arm 65 of the outboard lever assembly 63 is pin-connected normally at a right angle to a drive screw 66 of an electrical actuator unit 67. The actuator unit 67 is connected to a load limiter 68 which is mounted rigidly to the aircraft structure. Extension or retraction of the drive screw 66 by the actuator unit 67 will, therefore, operate the aileron 25 through the same links 23 and 23a as when the aileron is operated by the hydraulic actuating cylinder 15, since both the drive screw 66 and the actuating cylinder 15 are positively connected to both lever assemblies 21 and 63 by means of tube assembly 61. The actuator unit 67 is normally controlled by the switches in the switch box 33, and its construction and operation will now be described.

*Electrical actuator unit*

Figure 3 diagrammatically shows the internal relationships of the components of the electrical actuator unit. One end of the actuator unit 67 is pivotally attached to a load limiter 68. Inside the actuator unit is a compound wound D. C. reversible electric motor 69 which provides motive power to drive the aileron 25. The motor 69 has a motor shaft 70 which is connected to drive a two-speed gear train 71 through a friction clutch 72. The gear train 71 is provided with a multiple disk brake 73. Both the motor clutch 72 and the gear train brake 73 are controlled and operated simultaneously by a solenoid A whose arm 74 is acted on by a tension spring 75. When this solenoid is de-energized, the spring 75 will engage the brake 73 to apply braking force to the gear train 71, and at the same time, release the clutch 72 from the motor 69. When solenoid A is energized, its arm 74 will be magnetically pulled against the pull of the spring 75 so that the gear train brake 73 will be released and the motor clutch 72 will be engaged in driving position.

The gear train 71 drives an output shaft 76 to which is fixed a drive screw nut 77. Drive screw nut 77 turns on drive screw 66 which is made to extend or retract with the rotation of drive screw nut 77, and thus drive the aileron through tube assembly 61 and the lever assemblies 21 and 63. This drive screw and nut are of the ball bearing type and are reversible; that is, the nut portion can be revolved by axial loads on the screw portion, such as caused by air loads on the aileron or by movement of the hydraulic actuating cylinder 15.

The two-speed gear train is governed by solenoid B and solenoid C, both spring-loaded in the de-energized position. When neither of these two solenoids is energized, the gear train is disconnected within itself so that the drive screw nut 77 may free wheel in response to a push or pull on the drive screw 66 without turning the entire gear train. When only solenoid C is energized, the gear train is connected to rotate the drive screw nut 77 at low speed. When only solenoid B is energized, the gear train ratio is changed to rotate the drive screw nut at high speed.

Figure 4:
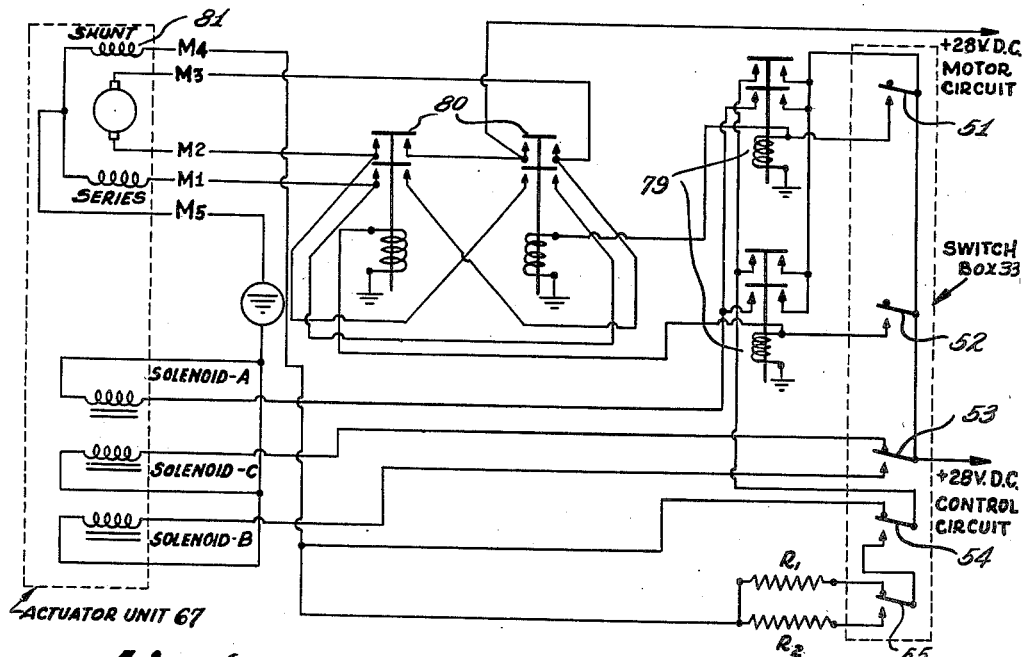
Figure 4 is a schematic electrical diagram showing the wiring of an electrical control system for an airplane attitude control surface.

In electrical operation, when no micro switches in the switch box 33 are closed, solenoid C only is energized, the gear train brake 73 is set, and the aileron is immovable, as shown in Figure 4. When a directional switch 51 or 52 is closed, solenoid A and the motor circuit are simultaneously energized (with solenoid C still energized), which releases the gear train brake 73 and starts the motor 69 in the proper direction to drive the aileron at low speed, designed to be approximately 5° of angular movement per second. If the other directional switch is closed instead, the leads to the brushes on the motor 69 are reversed to cause the motor to run in the opposite direction, as shown in Figure 4. The electric motor 69 has five wire leads. Wire M5 always connects to ground. For reversing the direction of motor rotation, the connections of the armature wires M2 and M3 are reversed. Thus, for operation in one direction, as controlled by the first switch 51, wires M1 and M2 are connected together and wires M3 and M4 are connected to the positive side of the D. C. line. For operation in the opposite direction, as controlled by the second switch 52, wires M1 and M3 are connected together and wires M2 and M4 are connected to the positive side of the D. C. line. The proper connections are made by switch relays 79 and motor relays 80 which are operated by the directional switches 51 and 52 in the control switch box 33.

When the first speed control switch 53 is closed in addition to the directional switch, solenoid B is additionally energized and solenoid C is de-energized, which action shifts the gear ratio of the system to move the aileron faster, at approximately 13° angular movement per second, for example, while the motor continues to revolve at the same initial speed.

When the second speed control switch 54 is closed, an external resistance R1 is added to the shunt field 81 of the motor, causing the motor to turn faster, using the same gear ratio as before, as shown in Figure 4. Preferred aileron surface velocity is now approximately 21° per second.

When the last speed control switch 55 is closed, a greater additional external resistance R2 is added in series with the shunt field 81, causing a still higher motor speed. A preferred maximum aileron velocity of approximately 30° per second is now attained.

It will be noted that when no power at all is supplied to the switch box 33 to control the actuator circuit, the aileron surface is not locked at any position, but may be moved up or down, causing the actuator drive screw nut 77 to free wheel separate from the gear train 71. This full-power electrical control and follow-up system is the subject of a co-pending application, Serial Number 65,806, filed December 17, 1948, and owned by the assignee of the instant application.

Up to this point, a complete hydraulic full-power system and a complete electrical full-power system have been described, either of which, when energized by its respective power supply, is connected to operate the same aileron when controlled by the same control stick, and in a manner which gives substantially the same operating characteristics as a direct manual control system, if the non-controlling system is suitably bypassed.

Figure 5:
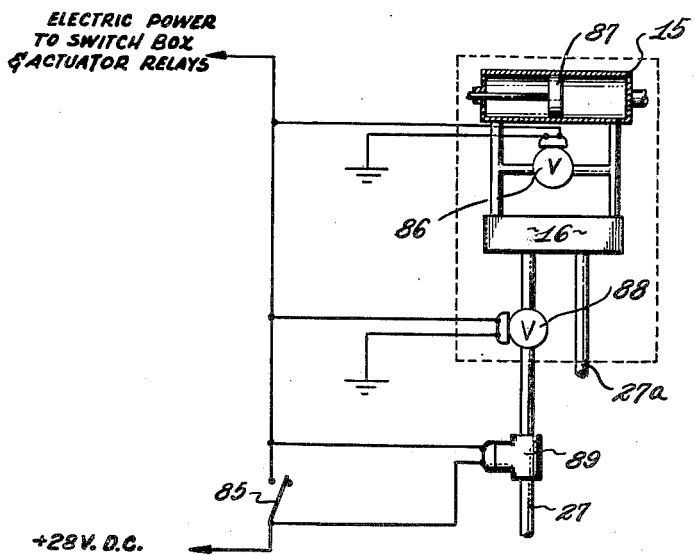
Figure 5 is a schematic diagram showing the basic components involved in shifting from electrical to hydraulic full-power operation of an airplane attitude control surface, or vice-versa.

Figure 5 shows diagrammatically how shifting of control from one system to the other can be accomplished. A two-position manual control switch 85 is provided at the flight station. The closed position of this switch selects the electrical control system and the open position selects the hydraulic control system. In the open position, no energy is supplied to the switch box 33; therefore, it cannot be operated, but the actuator drive mechanism will free wheel with any motion of the aileron surface, as described before. At the same time, the hydraulic system is in normal operation, and can control the aileron as usual. In the closed position of the manual control switch 85, electrical energy is supplied to both the switch box control circuit and the motor operating circuit, so that the entire electrical system is cut into operation. Simultaneously with the switch closing, two things happen in the hydraulic system: (1) A solenoid bypass valve 86 is opened, mutually connecting each side of the piston 87 in the hydraulic actuating cylinder 15. (2) A solenoid shut-off valve 88 is closed, shutting off the hydraulic pressure supply line 27 at the servo control valve 16. This action allows free wheeling action of the piston 87 without causing a hydraulic lock, and prevents the pressure line 27 from being continuously bled into the return line 27a. In actual practice, it is preferred that the above two valving operations be controlled by a single solenoid mounted on the control valve 16, since in the present apparatus the control valve 16 and actuating cylinder 15 are enclosed in a single housing.

In addition to the manual control switch 85, automatic emergency switching means is provided to shift from hydraulic to electrical operation if for any reason the fluid pressure drops below operating level. This is accomplished by including a pressure-operated switch 89 in the hydraulic pressure line 27, this switch being in parallel with the manual control switch 85, and adjusted to close when the pressure failure occurs.

It will thus be seen that both systems are in position at all times to be energized and assume control smoothly without affecting overall operating characteristics or producing a jerk in surface position or pilot's controls when the shift is made. This combination of two fully powered control systems alternately connectable to operate an airplane attitude control surface from the same single signal-producing input is the subject of a co-pending application, Serial Number 42,265, filed August 3, 1948, now Patent No. 2,638,736.

Figure 6:
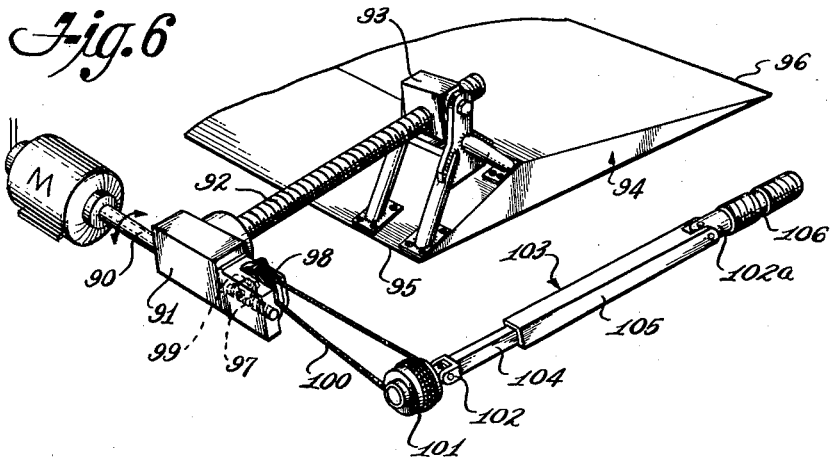
Figure 6 is a perspective diagrammatic view showing the output end of an airplane landing flap control system.

Having now shown the use of this latter-mentioned combination, the present invention consists of a mechanism to cause that same attitude control surface to deflect in relation to the movement of an independently controlled device, utilizing as a power means for this deflection whichever alternate full-power system is in normal control at the time of such movement. The independently controlled device in the specific apparatus shown herein is an airplane landing flap system, the output end of which is shown in Figure 6. A flap drive shaft 90 rotated by the flap drive motor M connects through a gear box 91 to a flap jackscrew 92 which rotates in a nut unit 93 attached to swivel on the framework of a landing flap panel 94. The flap panel 94, being hinged at its leading edge 95, deflects downwardly at its trailing edge 96 when the jackscrew 92 screws the nut unit 93 away from the flap drive shaft 90. The flap drive motor M may be operated by any suitable means under the control of the airplane pilot.

An extension 97 of the flap drive shaft 90 leads from the gear box 91 to drive a cable drum 98 by means of worm gears 99. A flap cable 100 wrapped around this cable drum 98 leads to and around a second cable drum 101 located near the aileron quadrant assembly 3, shown in Figure 1. The second cable drum 101 drives a universal joint 102 connected to a square tube 103. Thus, when the flap panel is raised or lowered by the turning of the flap drive shaft 90, the square tube 103 will rotate proportionately to the flap movement.

Figure 7:
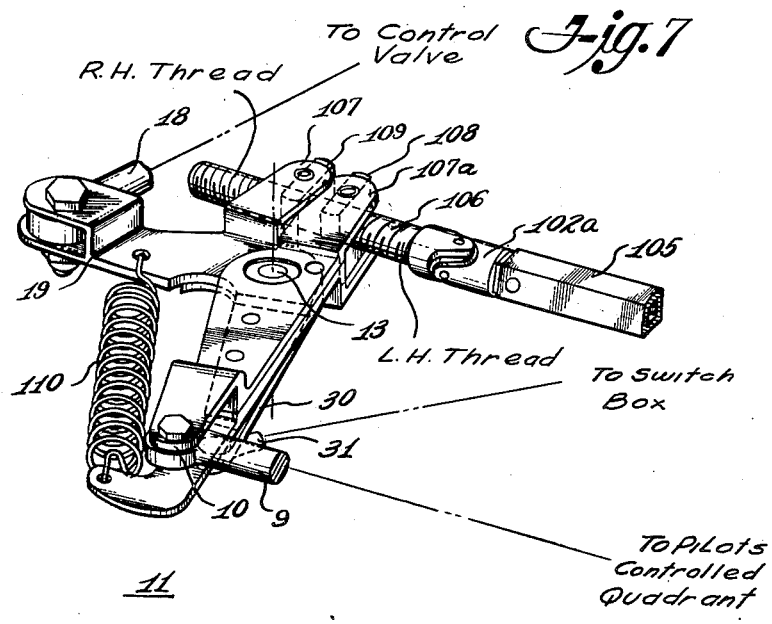
Figure 7 is a perspective view showing on a larger scale than in Figure 1 the connection of the flap control system of Figure 6 to the aileron control system.

This square tube 103 is made in two sections, an inner solid section 104 which is connected to the cable drum 101, and an outer hollow section 105 which fits over and can slide longitudinally on the inner section 104. The far end of the outer section 105 is connected with a second universal joint 102a to a threaded screw 106, half of which has a right-hand thread and half a left-hand thread. The threaded screw 106 is connected to the bell crank assembly 11 in the following manner:

The bell crank assembly 11 consists of two main parts, as shown in Figure 7, the upper part being the control rod arm 10 pivoted near one end to the bell crank axis pin 13, and the lower part consisting of the valve control crank 19 at one end and the crank leg 30 at the other end, this lower part being pivoted near its center to the bell crank axis pin 13 also. Each bell crank part carries a fork 107 and 107a, respectively, these forks positioned so that when the parts are assembled, a line through the center of the open space of each fork will lie in a horizontal plane parallel to the plane of rotation of each bell crank part and parallel to the sides of the forks. Vertically placed in each fork is a square nut 108 and 109, so installed that each is free to turn about a vertical axis extending from one side of its fork to the other. The nuts 108 and 109 are tapped with opposite-hand threads to mate with the threaded screw 106 attached to the square tube 103 is installed through the nuts connected to the forks, the left-hand threaded portion of the screw turning in one nut, and the right-hand threaded portion of the screw turning in the other nut. A bell crank spring 110 is preferably connected from the control rod arm 10 to the valve control crank 19 to keep the nut connection free of end play.

In this manner, the control rod arm 10 is connected solidly to the valve control crank 19 and crank leg 30 by the threaded screw 106 when the landing flap panel 94 is stationary. During normal aileron movement, the bell crank assembly 11 acts as a solid member, and as it pivots about its axis pin 13, the square tube 103 can lengthen or shorten without binding because of its telescoping action and the universal joints 102 and 102a at the ends of the tube 103. However, during lowering of the landing flap 94, the square tube 103 will rotate and screw the two nuts 108 and 109 away from each other. Assuming for the moment that the control stick 2 is stationary, the aileron control rod 9 and, therefore, the nut 108 attached to the control rod arm 10 will be held stationary. Therefore, this rotation of the threaded screw 106 will actually elongate the square tube 103 and move the one nut 109 only. When this occurs, rotation of the valve control crank 19 and the crank leg 30 of the bell crank assembly 11 about the bell crank axis pin 13 will pull the valve shaft 17 out of the control valve 16 and push the switch control rod 31 toward the switch box 33, which is the proper direction to lower the aileron 25, using whichever power system is in control at this time.

Since the bell crank assembly 11 is connected directly to the servo control valve 16 through the valve operating rod 18 only, less frictional resistance to movement of the valve occurs than from the bell crank assembly to the control stick 2. Therefore, practically no force at all is transmitted to the control stick by rotation of the square tube 103. Even if a force of some magnitude were imposed on the control stick through the connecting linkage from this one aileron, an equal and opposite force would also be exerted on the control stick from the aileron on the other side of the airplane, so that no resultant motion is imparted to change the roll control of the ailerons.

The square tube 103, as rotated by the landing flap mechanism, has acted on the same motion-producing members as the aileron control rod 9 would normally act upon, without affecting the position of the aileron control rod 9. A similar extension of the landing flap system on the other side of the airplane works on the opposite aileron mechanism in the same manner, so that as the landing flaps are simultaneously lowered, the ailerons are both lowered also.

It may easily be seen that both normal aileron control and aileron drooping by the flap mechanism can proceed at the same time, when necessary, since operation of one mechanism in no way interferes with the operation of the other. In fact, full range of aileron control on both sides of the new neutral position can still be obtained even after the ailerons are drooped the maximum amount along with the landing flaps. When the landing flaps are retracted, the ailerons will be power-moved back to their normal neutral position by the reverse action of the bell crank assembly 11 from that described above.

With the use of the present method, full-span landing flaps can be achieved while still retaining normal control of other wing-mounted surfaces. While this invention is described as being incorporated on a conventional type airplane with tail surfaces, it also applies to all-wing or other types of aircraft, wherein any such additional surfaces as would be deemed practical can be combined in the same manner at the same time for any purpose. In addition, this invention provides a method for controlling and using a single surface to accomplish landing flap, dive brake, and elevator or roll control functions, since erratically varying hinge moments do not cause variation of the control forces applied by the pilot. Furthermore, the same method can be used in any other situation where it is desired to couple two independent control sources to the input of a power-driven device.

Reference has been made herein to the pilot of the airplane as being human. Obviously, the system as herein described is ideally adapted for control by automatic piloting devices. In fact, the low and uniform control forces required for full-power operation of highly loaded control surfaces, as described herein, make the system readily adaptable for control by automatic pilots, and the same power units can be used for both human and autopilot control of the surfaces.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In an aileron and flap control mechanism for an airplane having a pilot controlled aileron actuating mechanism for moving right and left ailerons in opposite directions and flap actuating mechanism for moving right and left flaps in the same direction: a double-armed crank for each aileron, each said crank being adjustable to change the angle between the arms thereof and one arm of each crank being operatively connected to the right and left aileron actuating mechanism, respectively; aileron control means operatively connected to the other arm of each said crank for rotating said arms in unison to move said ailerons in opposite directions; and means operated by lowering and raising of said flaps connected to each crank for changing the angle between the arms thereof to move said ailerons in the same direction.

2. Apparatus in accordance with claim 1 wherein said latter means comprises a differential mechanism at each of said cranks, a flap follow-up member, and a linkage having an irreversible driving connection from said follow-up member to said differential mechanism.

3. In an airplane having a pilot's roll control member, right and left roll control surfaces, and a lift flap; the combination of flap actuating means operatively connected to said flap to lower and raise said flap; full power servo actuating means operatively connected to each roll control surface and having a control element therefor movable in two directions to energize said power means in either of two directions; a pair of two-arm cranks, one for each said control element, each said crank having one of its arms connected to the corresponding control element and the other of its arms to the pilot's roll control member for movement of said control surfaces in opposite directions by movement of the control member; each said crank being adjustable to change the angle between the arms thereof; differential means connected to each crank for changing the angle between the arms thereof; and driving means operatively connected from an output member of said flap actuating means to each of said differential means to change said angles to move the control surfaces in the same direction.

4. Apparatus in accordance with claim 3, wherein said driving means comprises a rotatable driving shaft assembly driven by said flap actuating means, said shaft assembly including two sections connected by a universal joint, and a third section having a longitudinal telescoping connection to one of said first two sections, whereby said shaft assembly can have angular misalignments and can longitudinally contract and extend without binding, to permit rotation of said crank carrying differential means.

References Cited in the file of this patent

UNITED STATES PATENTS

| Number | Name | Date |
|---|---|---|
| 1,199,036 | Hodgkinson | Sept. 19, 1916 |
| 1,300,047 | Thomas | Apr. 8, 1919 |
| 1,816,787 | Moss | July 28, 1931 |
| 2,183,279 | McCarty et al. | Dec. 12, 1939 |
| 2,220,194 | Albright | Nov. 5, 1940 |
| 2,286,150 | Mercier | June 9, 1942 |
| 2,344,594 | Bryant | Mar. 21, 1944 |
| 2,376,731 | Stoner | May 22, 1945 |
| 2,422,035 | Noyes | June 10, 1947 |
| 2,445,343 | Tyra | July 20, 1948 |
| 2,479,619 | Hilton et al. | Aug. 23, 1949 |

FOREIGN PATENTS

| Number | Country | Date |
|---|---|---|
| 598,520 | Germany | June 12, 1934 |
| 609,909 | Germany | Feb. 26, 1935 |